United States Patent [19]

Paul

[11] 4,012,354

[45] Mar. 15, 1977

[54] COMPOSITION AND METHOD OF FLOCCULATING MINERAL SOLIDS COLLOIDALLY SUSPENDED IN AN AQUEOUS MEDIUM

[75] Inventor: Stewart N. Paul, Ontario, Canada

[73] Assignee: Chemed Corporation, Cincinnati, Ohio

[22] Filed: Apr. 11, 1975

[21] Appl. No.: 567,325

[52] U.S. Cl. .................. 260/29.6 E; 260/29.6 MP; 260/42.54

[51] Int. Cl.$^2$ ...................................... C08L 33/26

[58] Field of Search ............. 260/29.6 E, 29.6 MP, 260/42.54; 210/54 R, 54 A

[56] References Cited

UNITED STATES PATENTS

| | | | |
|---|---|---|---|
| 2,783,200 | 2/1957 | Crum et al. | 210/54 A |
| 3,428,558 | 2/1969 | Murphy | 210/54 R |
| 3,463,730 | 8/1969 | Booth et al. | 210/54 A |
| 3,657,182 | 4/1972 | Jolly | 260/33.4 R |
| 3,699,048 | 10/1972 | Kruger et al. | 210/54 A |
| 3,839,500 | 10/1974 | Dexter | 260/874 |
| 3,876,573 | 4/1975 | Engelhardt et al. | 210/54 A |

Primary Examiner—M. J. Welsh
Attorney, Agent, or Firm—Charles L. Harness

[57] ABSTRACT

This invention provides an improved composition and method for dispersing high molecular weight polymers and copolymers used as flocculants for water and waste treatment by using, in combination with the polymer, a nonionic surfactant to retard polymer solubility, soda ash, a chelant, and a filler.

2 Claims, No Drawings

COMPOSITION AND METHOD OF FLOCCULATING MINERAL SOLIDS COLLOIDALLY SUSPENDED IN AN AQUEOUS MEDIUM

The present invention relates to a new and improved composition and method for dispersing high molecular weight polymers and copolymers in water, for the purpose of flocculating waste waters and other waters.

It is well known in the art that high molecular weight polymers, with molecular weights in the range of 1 to 20 million, are very difficult to disperse or dissolve in water, in order to make up feed solutions which can be used for treatment purposes. The conventional way in which this is done is to feed the dry powdered polymer slowly and carefully into the vortex of a vigorously stirred body of water. However, it is frequently difficult to do this in actual technical operations, due to the impatience of the common laborers who would be employed to make up such solutions. Such personnel tend to simply dump the powder into the water, start up the stirrer, and expect the material to dissolve. Under such circumstances, these polymers swell and ball up into extremely viscous masses, with dry and unswollen material inside which the water can not even reach, and many undissolved so-called "fish eyes" floating in the water. Under normal circumstances, it is impossible to get such a mass to completely dissolve even after hours or even days of stirring. For this reason, a considerable amount of work has been done attempting to develop improved and useful methods for producing dispersions and solutions of high molecular polymers in water. Sometimes the dry powdered polymer is wetted with a water soluble organic solvent, or it may be wetted with a surface active material in an attempt to improve the penetration into the particles, at the same time acting to separate them. (See, for instance, Dexter, U.S. Pat. No. 3,839,500 assigned to American Cyanamid and Keas, U.S. Pat. No. 3,817,891). Considerable fractions of water soluble inert salts, such as sodium chloride, may be used in order to separate the particles of polymer and reduce their tendency to ball up into insoluble masses. Mechanical feed devices, and eductors operated by flowing water have been described and are commercially used for this purpose; sometimes, with care, such devices work well with cold water, but may give considerable difficulty when used with hot water.

The present invention is based upon the discovery that certain types of nonionic surfactants, when blended into the polymer, produce a film which retards rather than accelerates wetting of the polymer particles, and improves their separation into small particles which do not tend to stick to each other. Soda ash is added to the combination to insure that the solution is alkaline, thereby assuring that the polymer will be present in the form of the water soluble alkali metal salt of the polymer. A small amount of polyphosphate is added to the composition to prevent calcium and magnesium hardness from reacting with the polymer and causing precipitation of insoluble polymeric salts when hard water is used for dissolving purposes. Finally, a filler such as sodium sulfate is included in the formulation to control moisture buildup and caking problems in the formulation, and to adjust the composition of the mixture to simplify the weighing of proper dosages.

The actual formulation of this composition will depend on the particle size of the polymer, the flow characteristics of the surfactant, particle size of the other raw materials, the moisture content, and the precent of active which is desired in the finished product.

Polymers and copolymers which may be used in the practice of this invention will include polymers and copolymers of acrylamide, particularly the copolymers of acrylamide or methacrylamide with the water soluble salts of acrylic and/or methacrylic acid, and copolymers with cationic polyacrylates such as dialkylaminoalkyl acrylates or methacrylates or quaternized dialkylaminoalkyl acrylates or methacrylates, and also copolymers with other vinylic monomers.

The copolymers of acrylamide and acrylates may be prepared by copolymerization of the monomers, or by partial hydrolysis of the polyacrylamide after polymerization. Other polymerizable vinyl compounds such as vinyl acetate, acrylonitrile, methaacrylonitrile, vinyl alkyl ethers, vinyl halides, and the like may be employed as secondary or ternary components of the polymer to impart desired properties to the product. Thus the polymers employed in the present invention may be represented graphically by the following general composition.

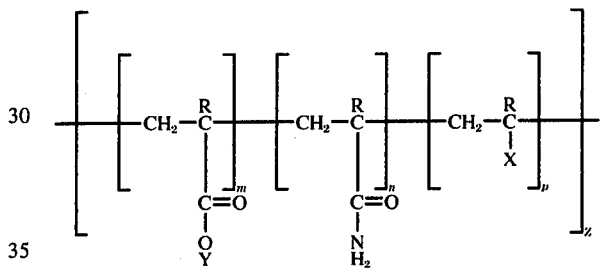

Wherein Y represents hydrogen, ammonium, and alkali metal, R represents hydrogen or a methyl group, X represents halogen, a lower alkoxy or acetoxyl group, a cyanide group, a dialkylaminoalkyl group or a quaternized dialkylaminoalkyl group, m ranges from 0 to 50, n ranges from 50 to 100, p ranges from 0 to 10, the sum of n plus m plus p is 100, and Z is at least 15,000. (m, n, and p represent percentages of the groups present).

Nonionic surfactants which may be used in the practice of this invention will be found under the following generic types:

1. Polyethoxylated-propoxylated fatty alcohols corresponding to the general formula given below,

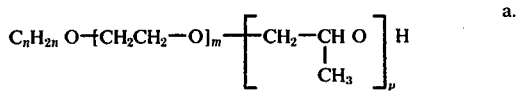

a.

Where n may be 12 to 20, m may be 1 to 50 and p may be 1 to 50 and polypropylene oxide to which ethoxy groups are attached to form block copolymers as shown below:

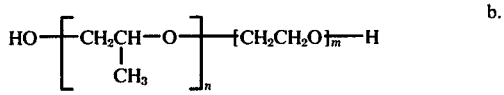

b.

where n may be 5 to 50 and m may be 1 to 10.

Generally speaking, these materials should have a preponderance of hydrophobic over hydrophilic groups. In other words, an HLB index below ten. Such materials have sufficient hydrophobicity to act as a barrier to slow the penetration of water to the polymer particle, and yet have sufficient water dispersibility so that eventually complete water wetting can take place. Examples of materials of type a would be polyethoxylated lauryl or stearyl alcohol, which carry sufficient propoxy groups copolymerized with the ethoxy groups to give the proper balance of hydrophlic-lyophilic groups. Actually the number of actual materials which show the desired property is small. Examples of type (a) include materials such as Triton DF-12, which is the trademark of Rohm and Haas for a modified polyethyoxylated straight chain alcohol, non-ionic surface active agent, or Alkaril LA-3. Examples of type (b), the block polymers of ethylene oxide and propylene oxide, would be some of the Pluronics (wyandatte) which have a preponderance of propylene oxide groups contained therein, and similar materials such as Mazur DF -60P.

The other components of this formulation; materials such as soda ash (sodium carbonate) or other solid alkalis; polyphosphates such as sodium tripolyphosphate, tetra sodium or tetrapotassium pyrophosphate, hexametaphosphate, etc., and fillers such as sodium sulfate, sodium chloride, etc., require no further description. These are standard articles of commerce; they are added to the formulation to assist in assuring that it works right in various situations and types of waters. For purposes of providing an example, a formulation which will exemplify the operation of this patent, without limitation to the particular components and proportions listed, is as follows:

EXAMPLE 1

1. Dow Separan MG-700, an anionic polyacrylamide — 33.0%
2. Triton Surfactant DF-12, non-ionic surface active agent — 0.3%
3. Light soda ash — 30.0%
4. Sodium tripolyphosphate — 2.0%
5. Anhydrous sodium sulfate — 34.7%

The first and second items are to be blended well together in a ribbon blender or similar equipment and then the third item is added and blended in. The fourth and fifth items may then be added and mixed until the material is uniform.

If, to make a 0.33% solution of Dow Separan MG-700 in water, the weighed powder were simply dumped in the stirred water, it would ball up and produce lumps and fish-eyes which would take days to dissolve. If the same amount of Separan MG-700 were to be slowly and carefully dusted into the vortex produced by vigorous stirring in a solution tank, the material would dissolve but it would take several hours to do so andd there might still be fish-eyes. If one takes the combination described under Example 1 to make a 1% solution (which would be equivalent to the 0.33% solution mentioned above), the mixture may be simply dumped in a batch into the water. There will be no clumping, the material will disperse separately throughout the stirred water, and the particles will slowly dissolve in the water taking about as much time to dissolve as they would if slowly and carefully dusted in, but without fish-eyes, and without the need to take time and labor for the careful feeding operation. Even working with eductors, automatic feeders, invert emulsion systems, etc., it is easier to make a solution with a minimum amount of labor using the type of product produced by the practice of this patent.

The solutions so prepared, of course, may be used for any purpose for which polyelectrolytes are usually needed: sludge dewatering, coagulation or flocculation, etc. Among the advantages which are obtained by the practice of this patent are: reduction in maintenance and down time, since there is less chance of producing thick coatings and deposits of undissolved material in the dissolving tanks which would have to be cleaned out by hand; an increase in process capacity because of the ease and speed of preparing the feed solution; more concentrated feed solutions can be prepared if necessary; and lower addition costs since the labor costs are greatly reduced.

It is to be understood that the practice of this invention is not limited to the specific example given but may cover any effective equivalent composition. The proportion of polymer may range as high as ninety percent. The proportion of surfactants may range between 1/10 to 5%, limited only by the necessity for producing a dry powdered formula. The soda ash need only be present in proportions equivalent to the available free carboxy groups in the polymer, if such are present. The sodium tripolyphosphate need be added only in the range of 1 to 5%, and the anhydrous sodium sulfate or other filler material may range from 0 to 70%.

Modifications and additions familiar to those skilled in the art, which do not interfere with the basic improvement embodied in this patent, namely; the slowing down of the solution of the polymer in order to provide dispersion of separate particles, should be construed as falling under the specifications of this patent.

What is claimed:

1. A flocculant composition readily dispersible in water consisting essentially of, A. up to 90% by weight of a polymer of the formula

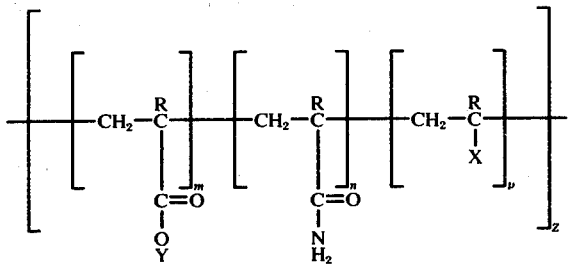

Wherein Y represents hydrogen, ammonium, and alkali metal, R represents hydrogen or a methyl group, X represents halogen, a lower alkoxy or acetoxyl group, a cyanide group, a dialkylaminoalkyl group or a quaternized dialkylaminoalkyl group, $m$ is 0 to 50, $n$ is 50 to 100, $p$ is 0 to 10, the sum of $n$ plus $m$ plus $p$ is 100, Z is at least 15,000, and $m$, $n$, and $p$ represent percentages of the groups present;

B. 0.1–5% by weight of a non-ionic surfactant having an HLB index below 10, selected from the group consisting of
 1. Polyethoxylated-propoxylated fatty alcohols of the formula,

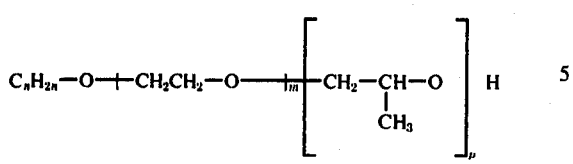

Where *n* is 12 to 20, *m* is 1 to 50 and *p* is 1 to 50, and

2. Polypropylene oxide to which ethoxy groups are attached to form block copolymers, of the formula,

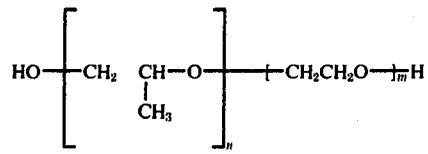

Where *n* is 5 to 50 and *m* is 1 to 10

C. soda ash in an amount equivalent to free carboxy groups, if any, in the said polymer;

D. 1–5% by weight of chelant; and

E. up to 70% by weight of a filler.

2. Flocculation method comprising dispersing the composition of claim 1 into a water system.

* * * * *